United States Patent [19]

Curtis

[11] 4,127,060
[45] Nov. 28, 1978

[54] AUXILIARY COOKING DEVICE FOR STUFFED POULTRY AND THE LIKE

[76] Inventor: Joseph Curtis, 421 15th Ave. North, Surfside Beach, S.C. 29577

[21] Appl. No.: 734,103

[22] Filed: Oct. 20, 1976

[51] Int. Cl.² .................. A47J 37/04; A47J 43/00
[52] U.S. Cl. .................................................. 99/419
[58] Field of Search ............. 99/419, 345–347, 99/352; 17/11; 165/185

[56] References Cited

U.S. PATENT DOCUMENTS

| 826,216 | 7/1906 | Asbury | 99/352 |
| 1,485,253 | 2/1924 | Devlin | 99/419 |
| 2,404,166 | 7/1946 | Danilla | 165/185 |
| 2,835,480 | 5/1958 | Perez | 99/419 |

FOREIGN PATENT DOCUMENTS 600,493  6/1960  Canada ........................ 17/11

*Primary Examiner*—Harvey C. Hornsby
*Assistant Examiner*—Timothy F. Simone
*Attorney, Agent, or Firm*—Albert H. Kirchner

[57] ABSTRACT

A device for promoting access of roasting heat to a dressed and stuffed poultry carcass comprises a metallic foil conical tube penetrating the entire body and open at both ends, with the larger end extending through a foil plate closing the carcass opening and holding the stuffing and tube therein.

4 Claims, 9 Drawing Figures

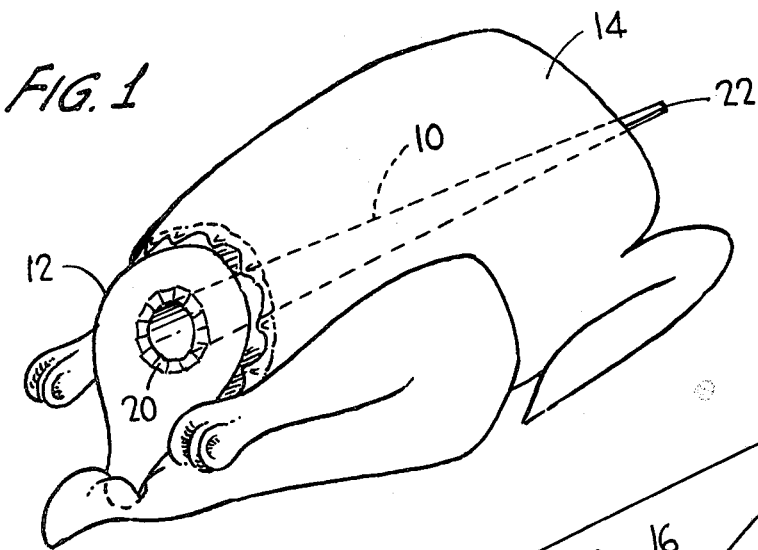
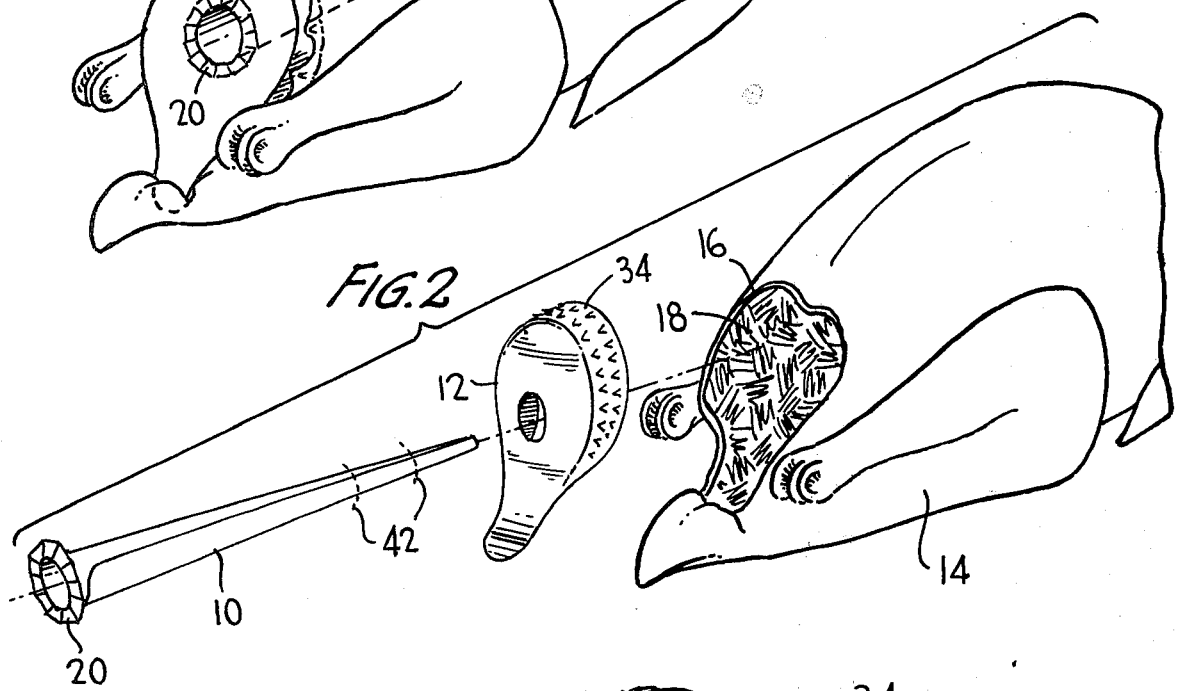
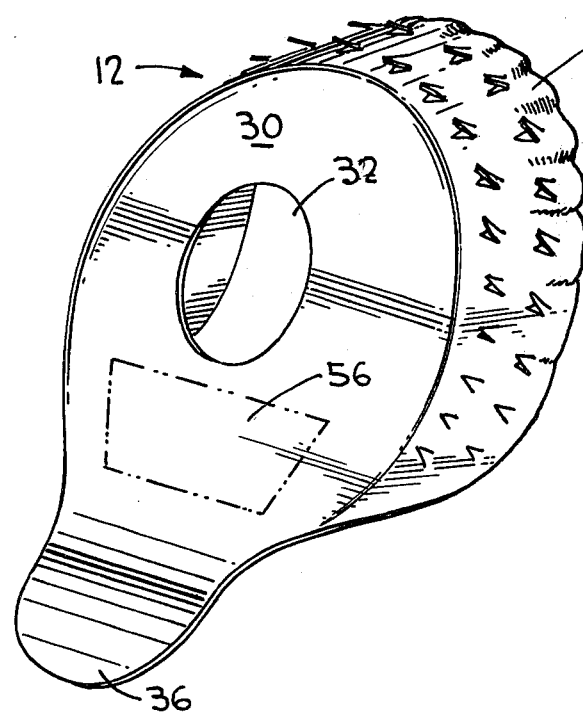
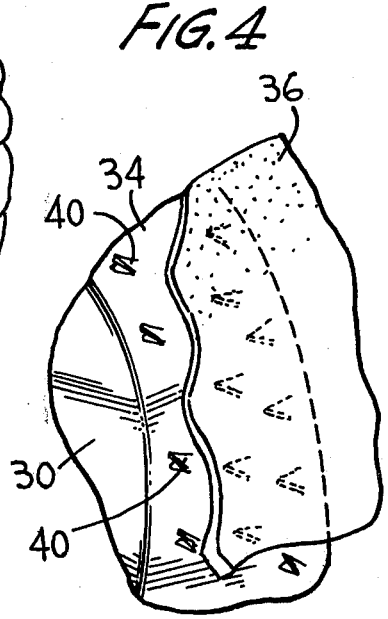

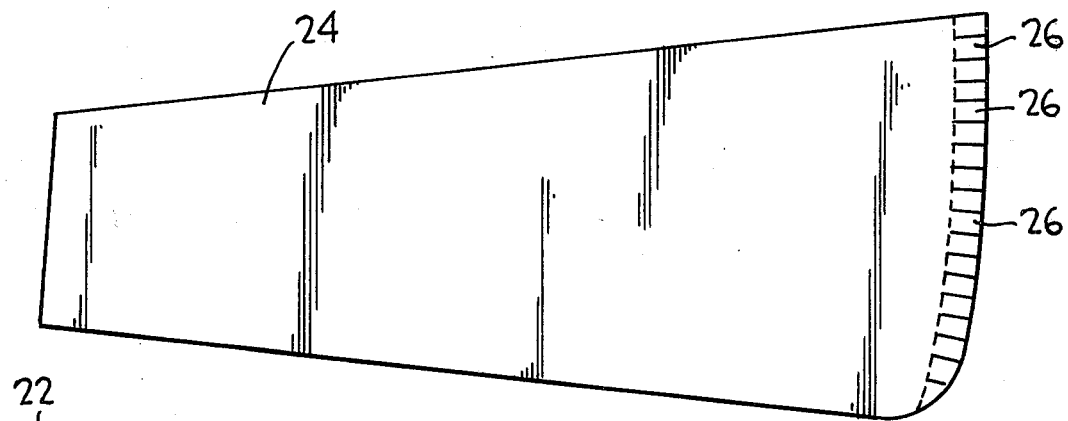
FIG. 5
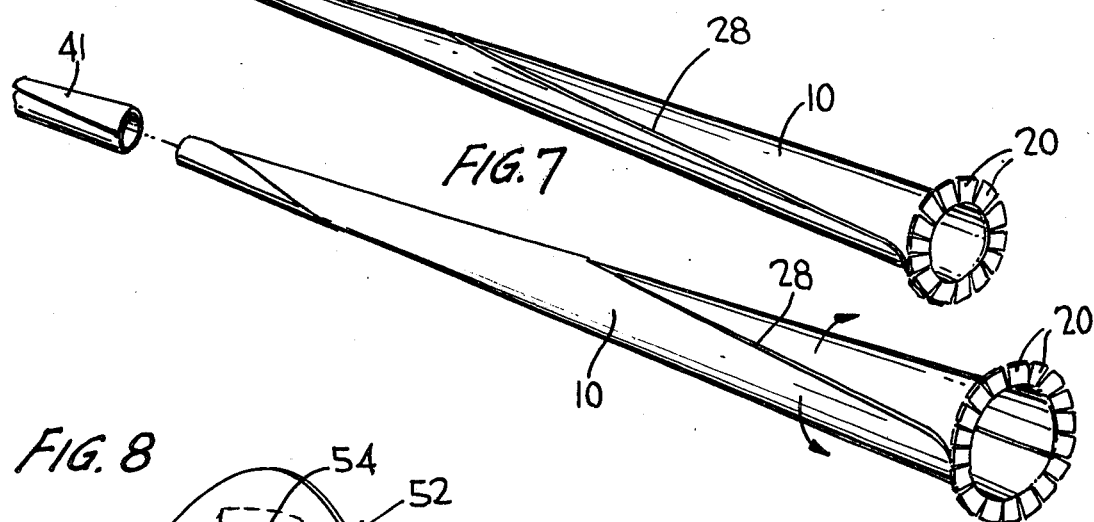
FIG. 6
FIG. 7
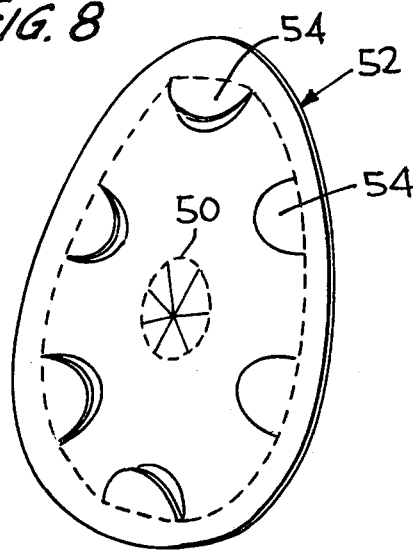
FIG. 8
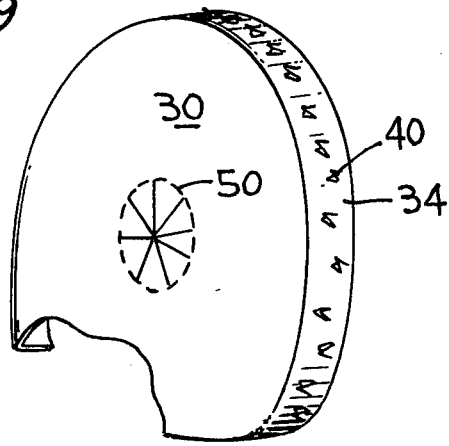
FIG. 9

AUXILIARY COOKING DEVICE FOR STUFFED POULTRY AND THE LIKE

BACKGROUND OF THE INVENTION

The baking or roasting of dressed and stuffed poultry in the heated atmosphere of an oven or the equivalent necessarily involves the considerable difficulty of bringing the cooking of the interior meat and the stuffing to completion substantially simultaneously with the cooking of the outer surface meat. Unless this is accomplished the total product is not uniformly cooked, the inside being underdone even when the exterior has been overcooked. Frequently the only solution of the problem has been to effect a compromise, the cooking being continued until examination of the outer surface, which is the only portion capable of being inspected during the cooking, appears to be overdone sufficiently to warrant the conjecture that the interior is no longer unacceptably underdone.

Attempts have been made to solve the somewhat similar problem involved in baking large solid cuts of meat, such as hams. One such attempt provided a stout metal spike having a hollow axial bore and a plurality of perforations in its side wall and a sharp pointed end that could be removed after the spike had been driven through the center of the ham. Hot air during the ensuing baking was expected to pass through the bore of the spike and promote the cooking of the innermost meat.

SUMMARY OF THE INVENTION

Whether or not the foregoing proposal was susceptible of successful use in the baking of hams, the spike did not solve the problem of poultry baking or roasting. The reasons are numerous, being principally the necessarily small diameter of the hollow bore of any spike that would be of sufficiently small outer diameter, and of heavy enough metal, to be driven forcibly through a solid body of uncooked meat. Household kitchens are generally lacking in hammers, drills and other tools useful in performing such a driving operation, and most housewives are hardly capable of doing the driving unassisted. The small diameter of the spike admitted too little heated air to be effective, and making the spike larger made driving it into place practically impossible. Moreover, the perforations in the spike wall, believed to be necessary in use in the cooking of ham, would be objectionable in contact with poultry stuffing which, under the stress of heat expansion and with the assistance of juices being rendered from the meat, would pass into the bore and soon clog it so as partially or completely to prevent the required free passage of heated air.

Consequently the small bore perforated heavy metal spike has not been useful in stuffed poultry baking.

The principal object of the present invention is to provide a modification and development adapting the heated air passing principle of the hollow spike to successful use in the baking or roasting of stuffed poultry.

Related objects are concerned with effecting the foregoing object by simple means which are eminently capable of being incorporated in single-use embodiments which are so inexpensive to make that they can be given free with purchase of the poultry, or can be otherwise distributed as an advertising medium.

Other objects and advantages will will be evident to those skilled in the art as the following description proceeds.

SHORT DESCRIPTION OF THE DRAWINGS

In the accompanying drawings, which illustrate certain complete embodiments of the invention which have been reduced to actual practice and have been found to give entirely satisfactory results in actual use, and which are accordingly at present preferred, FIG. 1 is a perspective view of the device provided by the invention installed in operative position in a dressed and stuffed turkey, ready for placement in a baking oven with, however, the leading end of the tube element of the device projecting and still untrimmed, as will be hereinafter explained;

FIG. 2 is a perspective view of the turkey and the tube and shield components of the invention, shown separated from their correct reletive positions prior to assembly and installation;

FIG. 3 is a perspective view of one form of shield;

FIG. 4 is a detail perspective view of the marginal portions of the shield and the adjacent meat or skin of the turkey in the overlapping relation which they assume on proper installation of the device;

FIG. 5 is a plan view of the metal foil blank from which the tube component is formed;

FIG. 6 is a perspective view of the tube component;

FIG. 7 is a similar view showing the tube with a small end extension that may be optionally provided to facilitate penetration by the tube in installation;

FIG. 8 is a perspective view of a second form of shield element; and

FIG. 9 is a perspective view of a third form of shield element.

DESCRIPTION OF THE PREFERRED EMBODIMENTS

The device consists basically of a tube 10, a preferred form of which is best shown in FIG. 6, and a shield 12, a preferred form of which is best shown in FIG. 3. Both are best made of aluminum alloy or equivalent metal foil of a gauge heavy enough to be form retaining so as to resist distortion during handling in use and yet sufficiently thin and light to be highly conductive of heat during use. There are no critical limits in the specification of acceptable material. However, it has been found that excellent results are obtained by making both the shield and the tube out of fully annealed 3003 aluminum alloy foil having a thickness of 0.004 inch, manufactured by Reynolds Metals Company, Richmond, Va. 23261.

A typical object to be baked or roasted in accordance with the invention is a dressed and stuffed poultry body or carcass, such as the exemplary turkey or other fowl shown at 14, which has been eviscerated through the enlarged rear end opening 16 and filled with the customary dressing, stuffing or filling 18. As will be understood, it is this well filled cavity that heretofore has received insufficient cooking heat and which is now to be subjected to heat approaching that which the enclosing oven (not shown) applies to the outer surface of the meat.

The tube 10 is of enlongated tapered or conical shape, with a radially outwardly flaring flange 20 surrounding the opening at the larger end of the tube. The smaller end 22 of the tube is closed, or nearly closed, by the continued taper. A blank appropriately shaped and proportioned to be rolled on itself to form the tube is shown at 24 in FIG. 5, where it will be noted the larger end margin is cut to provide a plurality of separate tabs 26 which can be turned outwardly to form the flange 20 when the blank is rolled spirally into the conical product 10. This spiral rolling results in the outer side edge 28 of the blank overlapping the main body of the sheet so that the tube wall is complete and the whole tube is quite stiff, with a rigidity that increases toward the smaller end 22, where the bore is smaller and the number of overlying plies of sheet material is greater.

The overlapping plies of the material rolled into tubular formation are not held together by any added adhesive or the like. They remain in their rolled or wound up condition solely by reason of the inherent pliability of the foil and its tendency to retain the wound up form with, however, freedom of the plies to slide on each other and a tendency to unwind slightly, with concomitant enlargement of the tube diameter. This is an important feature of the preferred form of the invention for much of the use to which it is put, as will appear hereinafter.

Cooperating with the tube 10 is the shield 12. The function of the shield is to serve as a closure for the relatively large opening 16 through which the fowl has been eviscerated and the filling 18 inserted, and to fix the location of the inserted tube. For this purpose the shield is substantially a plate 30 formed of metal foil like that of the tube 10. It has a central hole 32 and a somewhat less than completely peripheral flange 34 bent back from what may be regarded as the top and two upper side edges of the plate 30. The lower portion of the plate may take the form of an unflanged tab 36. The result is a total plate area of approximately the shape and size of the opening 16. Thus the shield can be installed in full covering relation to the opening, with the flange 34 extending into the carcass at much of the edge of the opening, so that the margin of skin, or of meat with or without a skin covering, will overlie the flange, in whole or in part, as shown at 38 in FIG. 4.

To hold the shield in this position, as shown in FIG. 1, the flange 34 is best provided with a plurality of sharp struck-up barbs 40 which readily penetrate and catch the under side of the overlapping skin or meat 38, as best shown in FIG. 4.

With the shield thus installed, the tube 10 is applied. The tube is pushed into the body of stuffing 18, small end leading, through the shield opening 32, until the small end penetrates the front end of the fowl and projects therefrom and the tube flange 20 is well seated against the margin of the shield opening. This is the relationship of parts shown in FIG. 1. The stiffness of the tube, particularly that of the smaller, substantially closed leading end 22, facilitates this penetration. If difficulty is encountered in getting the end through the front wall of the fowl, it is a simple matter to use a sharp knife to make a small slit that will pass the tube end.

In some cases, as where a tube is to be made in specially large size, it may be desirable to provide a short extension, shown at 41 in FIG. 7, to be slipped over the smaller end of the tube to facilitate entry and penetration through the shield opening, the mass of stuffing, and the front wall of the carcass. It is to be understood that the extension 41, shown with its smaller end broken off because of lack of space on the drawing sheet, in actual practice is longer, terminating in substantially a point.

When the tube is fully seated in position, with the flange 20 engaged with the shield plate portion 30, the extension 41, if one has been used, is removed, and the protruding small end 22 of the tube is cut off close to the outer surface of the fowl body and discarded, as suggested by the cutting lines 42 in FIG. 2. This cutting of the foil material of the tube is readily done by use of ordinary household scissors or shears. If the cutting tends to crimp the tube wall into closing the bore, the bore should be opened fully by bending the foil at the new end of the tube into roundness. This is desirable so that movement of heated air through the tube will not be prevented or retarded.

FIG. 3 suggests that the shield 12 is finished with a complete opening 32 for reception of the tube 10 and marginal overlapping by the tube flange 20. It has been so shown for clarity of illustration of the invention. It has been found preferable, however, to make the central plate area 30 of the shield with the perforated and scored arrangement shown at 50 in the shield 52 in FIG. 8. In this embodiment a small hole is formed at the center of a number of lines that are cut, or merely scored, in the foil, radiating from the hole, so that when the leading small end 22 of the tube is pushed through this central area, a plurality of sector shaped flaps will bend inwardly, thus providing a substantially circular opening quite well conforming to the diameter of the adjacent portion of the fully installed tube.

The shield having the cut or scored flap-forming central area may be otherwise like the shield shown in FIG. 3, as illustrated in FIG. 9, or it may lack the peripheral flange 34 of that shield and have a ring of semi-circular tabs 54 cut into its flat plate structure to form openings in which small portions of skin or meat surrounding the carcass opening 16 can be tucked in and pinched to hold the shield in proper position.

As hereinabove indicated, in the preferred embodiments of the invention the blank sheet 24 is rolled loosely on itself to form the tube 10, and the tube is left in this loosely rolled condition. The inherent tendency of the wound-up roll is thus to unwind somewhat, i.e., to expand as suggested by the arrows in FIG. 7. The tube is best formed in a size, i.e., diameter, somewhat larger than the largest size in which it may be expected to be used. Hence, just before inserting the tube through the opening 32 in the previously installed shield, the tube is twisted sufficiently to slide the convoluted plies over each other so as to reduce the tube diameter enough for ready movement through the shield opening (and incidentally giving the tube increased stiffness for better penetration of the dressing 18). When fully seated in position the tube tends to expand radially by unwinding until it substantially fills the shield opening, thereby making snug contact with the shield and preventing egress of any of the dressing.

It will be recognized that all the foregoing operation in use of the device is easily and readily accomplished, requiring much less time and skill than the heretofore customary work of sewing up the carcass opening to prevent loss of the filling during cooking.

It will also be recognized that the device, being made entirely of inexpensive metal foil, is well adapted to be sold, or given away free, for single use. In this connection the plate portion 30 of the shield provides space, shown at 56 in FIG. 3, for display of advertising, directions for use, or other text.

Within the scope of the appended claims, as defined by their express limitations, some of the principles of the invention may be practiced without inclusion of others. That is to say, various details of the preferred embodiments herein disclosed may be altered, or omitted, or differently combined, within the spirit of the invention and the scope of the claims.

I claim:

1. An auxiliary cooking device for promoting access of even heat directly to the interior of a poultry body which has been stuffed after being eviscerated through an opening in the rear end of the body, said device comprising a shield and an elongated tapering tube of circular cross section, said shield being formed of metal foil having a peripheral margin adapted to be positioned on the poultry body in contacting relation to the margin of said opening and being cut in its central area to form a substantially circular opening concentric with the opening in the body and of a size to make substantial contact with the outer surface of the tube upon penetration thereby, said tube being formed of metal foil of sufficient thickness such that it can be cut by conventional kitchen shears, and said tube having an opening in its larger end of substantially the same size and shape of said circular opening in the shield, and a radially outwardly flaring flange surrounding said opening in the larger end of the tube to close the opening in said shield, and said tube having a substantially closed, bluntly pointed smaller end, said tube being pushed, with its smaller end leading, successively through said penetrable area in the shield, the stuffing, and the front end of the poultry body, to a position in which the tube substantially fills the opening in the shield and the tube flange overlies the shield opening in substantial contact with the margin thereof, said tube holding the shield against the poultry body, with the smaller end of the tube extending beyond the front end of the poultry body, accessible for shearing off and removal to provide the tube with a new smaller end having an opening of greater diameter than that of the original smaller end, said tube being formed of a sheet of metal foil rolled loosely on itself to permit radial expansion and contraction in use to adjust the bore size of the tube to the size of the opening formed in the shield by penetration of the tube.

2. An auxiliary cooking device as claimed in claim 1 in which the marginal area of the shield is provided with barbs adapted to make holding engagement with the margins of the poultry body surrounding the opening therein.

3. An auxiliary cooking device as claimed in claim 1 in which the penetrable area of the shield comprises a small hole in the center of the area, with scored lines of weakness radiation from said hole for ready rupture to form a plurality of sector-shaped flaps extending inwardly upon insertion of the tube.

4. An auxiliary cooking device as claimed in claim 1 in which the penetrable area of the shield comprises the periphery of a central circle marked by radial cuts defining sectors adapted to be pushed apart and bent inwardly upon insertion of the tube.

* * * * *